UNITED STATES PATENT OFFICE.

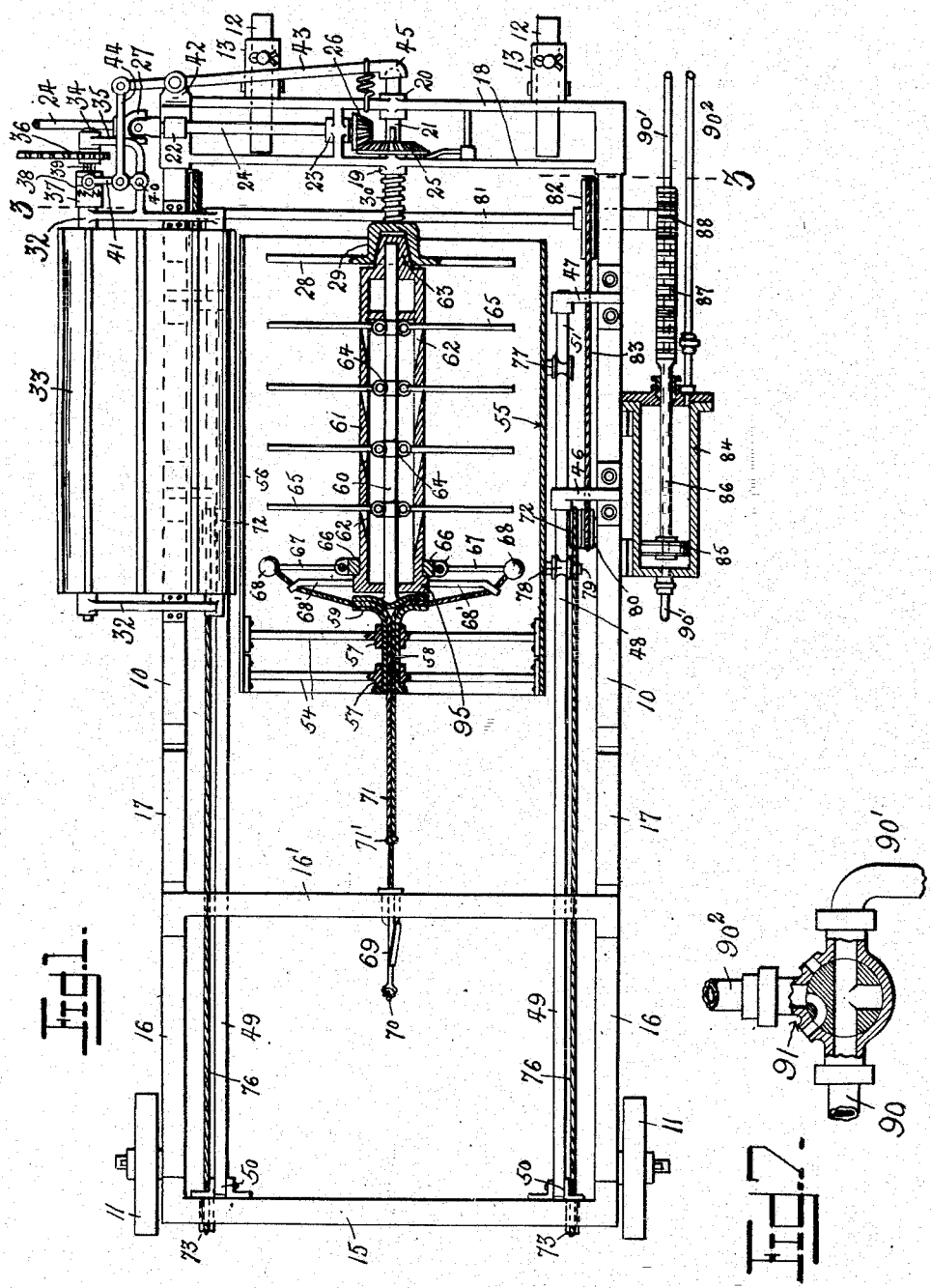

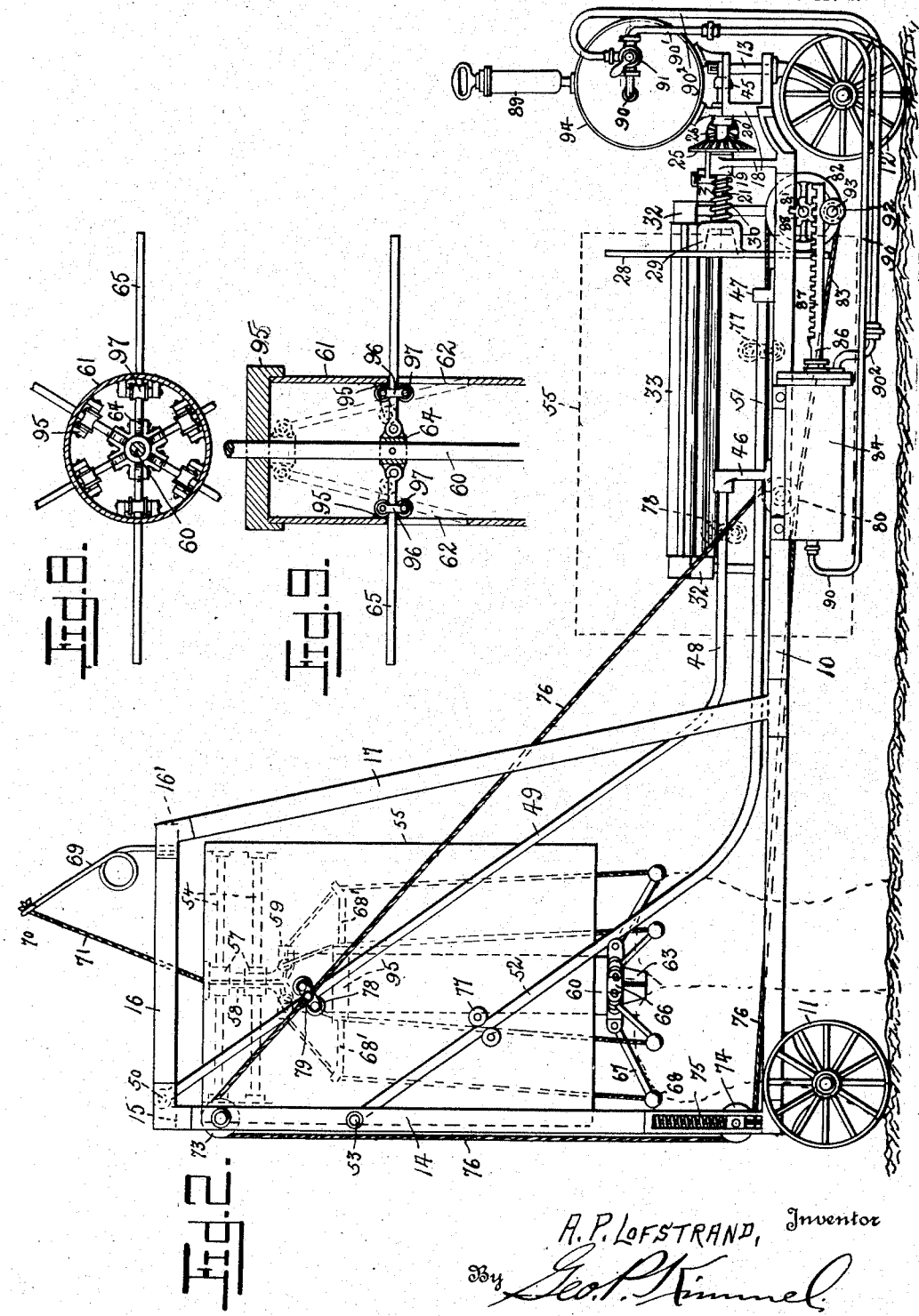

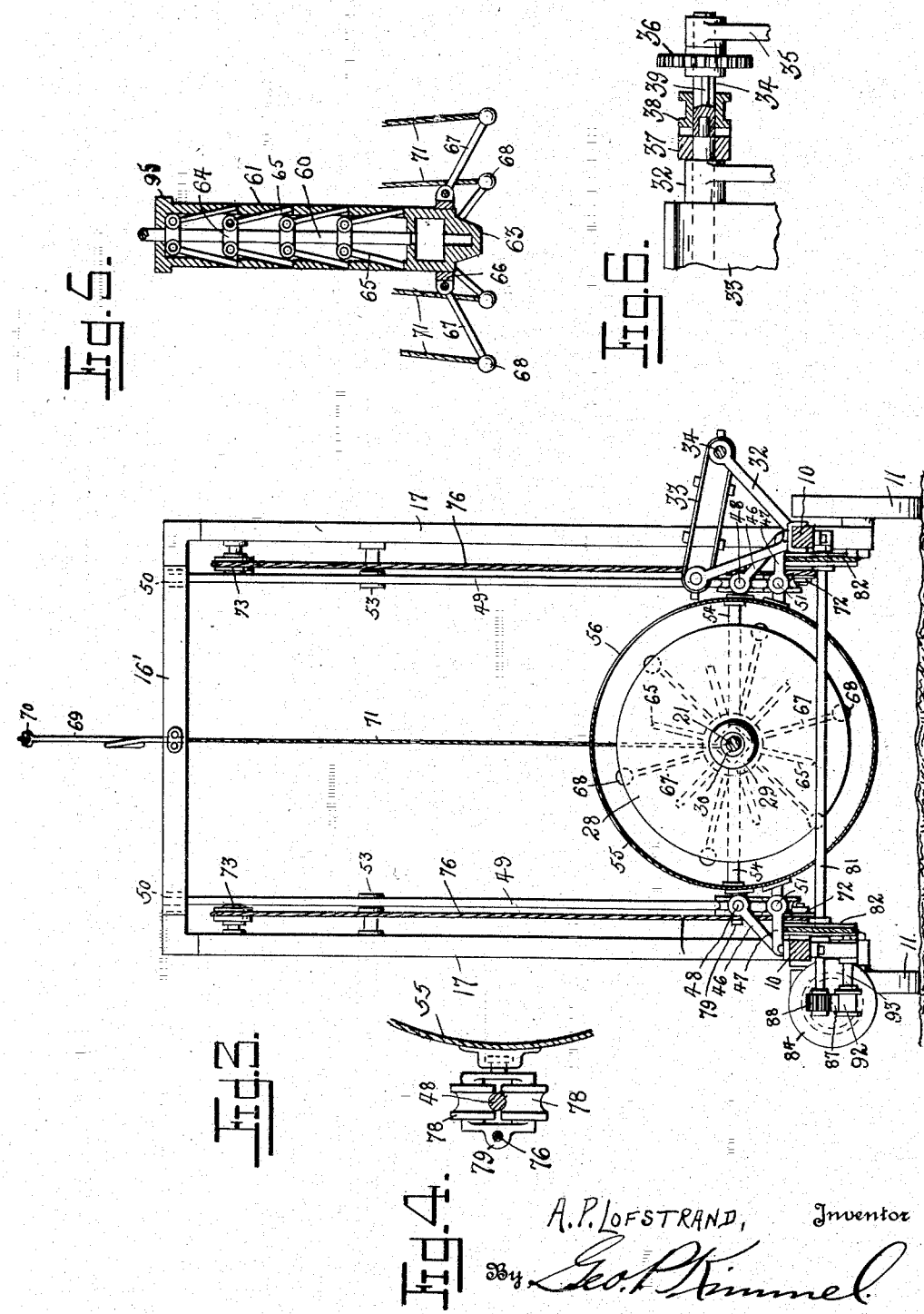

ALBIN P. LOFSTRAND, OF EDMONTON, ALBERTA, CANADA.

AUTOMATIC GRAIN-SHOCKER.

1,340,781. Specification of Letters Patent. Patented May 18, 1920.

Application filed July 2, 1919. Serial No. 308,276.

*To all whom it may concern:*

Be it known that I, ALBIN P. LOFSTRAND, a citizen of the United States, residing at Edmonton, in the Province of Alberta and Dominion of Canada, have invented certain new and useful Improvements in Automatic Grain-Shockers, of which the following is a specification.

This invention relates to apparatus for arranging bundles of grain when delivered from harvesters and binders into shocks or "stooks", and commonly known as shockers or stookers, and has for one of its objects to improve the construction and increase the efficiency and utility of apparatus of this character.

Another object of the invention is to provide a device of this character provided with means whereby the bundles of grain which are to form the shock or stook are retained in vertical position until deposited upon the ground, and the head ends of the bundles compressed and the butt ends correspondingly distended to increase the area of the base of the shocks and correspondingly increase their stability upon the ground.

Another object of the invention is to provide a device of this character including a bundle receiving cage with means for holding the several bundles in separated positions while within the cage, and means for automatically ejecting the bundles when the cage is moved into discharging position.

With these and other objects in view, the invention consists in certain novel features of construction as hereafter shown and described and then specifically pointed out in the claims, and in the drawings, illustrative of the preferred embodiment of the invention.

Figure 1 is a plan view, partly in section of the improved apparatus,

Fig. 2 is a side elevation,

Fig. 3 is an end elevation with the main frame and belt shaft in section on the line 3—3 of Fig. 1, Fig. 4 is an enlarged detail of one of the guide roller hangers, illustrating the manner of attaching the pull cable, Fig. 5 is a sectional detail of the tubular finger supporting member with the fingers withdrawn, Fig. 6 is an enlarged detail of the clutch device.

Fig. 7 is an enlarged sectional detail of the three-way controlling valve,

Fig. 8 is a transverse section, enlarged, of the stop finger carrying drum, illustrating a modification in the construction.

Fig. 9 is a longitudinal section of the parts shown in Fig. 8.

The improved apparatus is mounted upon a suitable supporting frame having carrier wheels, and arranged to be moved with the grain harvester.

The improved apparatus comprises an oblong supporting frame represented as a whole at 10 and mounted upon carrier wheels 11—12, the carrier wheels 12 being preferably mounted upon swivel hangers 13, so that they may be turned to guide the apparatus.

This frame 10 is left without a traverse member at the rear, so that the apparatus will pass over the shock when the latter is deposited. At the rear end vertical standards 14 are attached to the base frame 10 and connected at their upper ends by a transverse member 15 and relatively short side members 16, the latter being supported at their forward ends by obliquely directed members 17 and transverse members 16'. At their forward ends the side members 10 of the base frame are connected by a frame 18 including spaced transverse members as illustrated in Fig. 1, the spaced members of the frame 18 being provided with bearings 19—20 to receive a shaft 21. The frame 18 is likewise provided with bearings 22—23 to support a shaft 24 at right angles to the shaft 21. The shaft 21 is provided with a bearing plate 28 at one end and a gear wheel 25 at the other end while the shaft 24 is provided with a gear pinion 26 engaging the gear wheel as illustrated in Fig. 1. The shaft 24 is provided with a universal coupling 27 and is adapted to be driven from a portion of the driving mechanism of a grain harvester, the latter not being shown. Attached to the frame 10 are brackets or hangers 32 having suitable bearings carrying an endless slatted belt 33. One of the journals of the slatted belt is extended as shown at 34 and supported at its outer end by a bracket 35 extending from the adjacent bracket 32. Mounted for rotation with the shaft or journal 34 is a chain wheel 36, and the shaft 34 is likewise provided with a clutch member 37. The clutch member and chain wheel being rotated with the shaft. Slidably mounted upon the journal 34 is an opposing clutch member 38, rotated with the shaft and slidable thereon through the action of a feather key 39 or like device. Pivoted at 40 upon the bracket 35 is a shipper lever 41 having a yoke of the usual form coacting with the movable clutch member 38. Extending from the adjacent portion of the frame 18 is a bracket 42 in which an operating lever 43 is pivoted. The lever 43 is connected to the lever 41 by a link 44. At its outer end the shaft 21 is rounded and engaging in a cap device on the lever 43.

The shaft 21 is rotated continuously through the action of the shaft 24, while the spring 30 normally maintains the member 28 in its forward position and the lever 43 in position to hold the clutch 37—38 in opened or disconnected position, the object to be hereafter explained.

Attached to the frame member 10 are standards 46 and 47 in spaced relation, the standards 46 being spaced a considerable distance above the upper line of the frame member 10, while the standards 47 are located nearer the upper line of the member 10, as illustrated in Fig. 2. Connected at their forward ends in the standards 46 are guide rods or members, each including a transverse portion 48 and an upwardly and rearwardly inclined portion 49. At their upper ends the inclined portions 49 of the guide members are connected at 50 to the horizontal frame members 15. Attached to the bracket 47 are similar guide rods each including horizontal portions 51 and upwardly inclined portions 52. At their upper ends the portions 52 are connected as shown at 53 to the vertical members 14 of the frame. The horizontal portion 48—51 of the guide members are in parallel relation, while the inclined portions 49—52 are likewise in parallel relation as illustrated in Fig. 2.

A cage or receptacle device represented as a whole at 55, forms a part of the improved device, and is cylindrical in outline with a relatively large opening 56 in one side as represented in Fig. 3. The opening 56 is located opposite the discharge end of the belt 33 as illustrated in Fig. 3, so that the bundles of grain are carried over the belt and into the cage device 55. Rigidly supported within the member 55 near its rear end are supports 54 having bearings 57 to receive a shaft 58. The shaft 58 is tubular and is provided at its forward end with lateral tubular branches 59 and with an extension rod or shaft 60. Slidably disposed upon the rod 60 is a tubular member 61 having a plurality of lateral apertures 62, the inner portions of the apertures being inclined toward the rear end of the member 61 as illustrated in Fig. 1. At its inner end the member 61 is provided with a square tapered projection 63 adapted to engage in a square socket 29 in the hub of the member 28. The rod or shaft 60 is provided with a plurality of studs 64 to each of which a finger 65 is pivoted and projects respectively through the apertures 62 as illustrated in Fig. 2. The member 61 being slidable upon the rod or shaft 60, it is obvious that the member 61 when disposed in one position will cause the fingers 65 to project at right angles as shown in Fig. 2, and when the member 61 is moved along the member 60 to its other position, the finger 65 will be withdrawn into the member 61, as illustrated in Fig. 5, the object to be hereafter explained.

Slidably disposed upon the member 61 is a collar 66 having a plurality of lateral ears in which rods 67 are pivoted, the rods having weights 68 at their outer ends as shown. The member 61 at its rear end is provided with supporting arms 68' as shown in Fig. 2. Attached to the upper end of the frame members 17 is a spring arm 69, and connected at 70 to the upper end of the spring arm is a pull cable or flexible member 71.

The flexible member 71 branches at 71' and the branches are extended through the tubular shaft 58 and the lateral tubular branches 59 and thence through eyes in the outer ends of the projecting arms 68' and thence to the outer ends of the arms 67. By this arrangement it will be obvious that the spring arm 69 exerts its force to maintain the collar member 60 and its attachments in position at the rear end of the member 61 as shown in Fig. 2, the object to be hereafter explained.

Mounted upon the base member 10 intermediate their ends are cable guide pulleys 72, while similar guide pulleys 73 are mounted upon the vertical members 14 near their upper ends. Mounted in the lower ends of the members 14 are other cable guide pulleys 74, as shown in Fig. 2. The journals of the pulleys 74 are spring supported as illustrated at 75, so that the pulleys 74 are yieldably supported. Engaging over the pulleys 72—73 and 74 are endless carrier cables 76. As shown a set of the cables 72—73 and 74 are arranged at each side of the machine so that two of the endless cables 76 are employed as illustrated in Figs. 2 and 3. The cage device 55 is provided with guide pulleys 77 engaging the guide rods 51—52, while similar guide pulleys 78 are attached to the member 55 and engage the guide members 48—49, as shown. The cable members 76 are connected as shown at 79 to the bearings or brackets which support the pulleys 78, so that the latter are moved by the cable along the members 48—49 and carry the cage with them. The journals of the guide pulleys 72 are extended to receive cable pulleys 80, as shown in Fig. 1, and mounted for rotation upon the members 10 near their forward ends is a transverse drive shaft 81 having cable pulleys 82 in alinement with the cable pulleys 80. Endless cables 83 are carried over the pulleys 82 and 80, so that the rotation of the shaft 81 is communicated to the pulleys 72.

By this arrangement the rotation of the shaft 81 is communicated to the endless belts 76, as will be obvious.

Attached to one of the members 10 is a cylinder 84 having a piston 85 and piston rod 86, the latter having a gear rack 87 engaging a gear pinion 88 on the shaft 81. The cylinder is adapted to receive compressed air to move the piston 85 and its rod 86 and thus communicate motion to the shaft 81 through the coaction of the rack 87 and the pinion 88. Any suitable container for the compressed air may be employed, but for the purpose of illustration a conventional container of this class is represented at 94. Any suitable means may be employed for charging the receiver 94, but for the purpose of illustration a conventional air pump 89 is shown for this purpose.

If preferred a compression pump may be connected to be operated by the binder mechanism of the harvester, but as this feature forms no part of the present invention it is not deemed necessary to illustrate it.

Leading from the member 94 is a supply pipe 90 connected into the suitable three-way controlling valve 91. Conductor pipes 90 and 92 lead from the two way valve and are connected into the opposite ends of the cylinder 84 as shown. The rack contained portion of the piston rod is supported below the pinion 88 by an anti-friction roller 92 upon a stud 93 connected to the adjacent portion of one of the members 10, as shown in Fig. 2.

The improved apparatus is designed to be coupled in any suitable manner to a grain binder and harvester, and to be moved over the field therewith, with the belt 33 arranged to receive the bundles from the binder, but as the harvester and binder form no part of the present invention it is not deemed necessary to illustrate them.

The drive chain 36 is adapted to be actuated from the sickle shaft of the harvester and rotates the shaft 34 constantly as the harvester and the coupled shocking apparatus is moved forwardly, and the same is true of the shaft 24 which is adapted to be coupled to the knotter mechanism of the binder.

The member 28 thus rotates constantly, and is held normally in rearward position by the spring 30, with the levers 43—44 and 41 holding the clutch 37—38 open and the endless conveyer belt 33 stationary. When the cage is in its forward position the hub 29 of the member 28 couples the interior of the cage to the shaft 21 and rotates it, this movement actuating the levers and starting the endless carrier belt 33, so that the belt operates at the same time with the device 61 and its fingers 65 of the cage. When the cage is delivering its load the spring 30 disconnects the clutch 37—38 and stops the belt 33.

With an apparatus thus connected the operation is as follows:

Assuming that the cage 55 is coupled in relation to the shaft 21 through the coaction of the members 29 and 63, and rotated thereby. This position of the shaft 21 causes the compression of the spring 30 and also causes the levers 43—44 and 41 to close the clutch 37—38 and rotate the belt 33.

This latter position of the cage applies strain to the pull cable 71 and holds the arms 67 and collars 65 in rearward position and likewise holds the tubular member 61 in its rearward position and the fingers 65 in projected position, as shown in Fig. 1.

Each longitudinal series of the fingers 65 form a pocket like portion within the cage, and as the member 61 and its fingers is slowly revolved past the opening 56 in the cage, the bound bundles of grain are fed one at a time into the pockets. When the pockets are all supplied the valve 91 is turned and air admitted to the cylinder 84 in the rear of the piston 85. The motion of the piston is thus transmitted to the shaft 81 and thence through the cables 76, the latter in turn moving the cage and its contents along the guide member 48—49 and 51—52, as before described, and into vertical or discharging position as indicated in Fig. 2.

As the cage is thus drawn away from the member 28 the spring 30 by its reaction actuates the levers 43—44 and 41 and opens the clutch 37—38 and stops the belt 33, the latter thus remaining stationary while the cage is being unloaded.

As the cage is moved into discharging position the tubular member 61, which is relatively heavy, drops by gravity until stopped by the contact of the nearest series of lugs 64 with the rearward or upper closed end of the tubular member, as indicated in Fig. 5. This movement withdraws the fingers 65 and releases the bundles of grain. In the meantime the collar 66 is moved by gravity along the member 61 carrying the weighted rods 67 therewith and causing them to follow the released bundles of grain and form a cap to the head ends of the bundles and compress them and correspondingly distend the butt ends and thus not only hold the shock or stook intact during its descent to a position upon the ground, but also increases the stability.

When the gavel or collection of bundles of grain have been discharged, the valve 91 is turned to cut off the compressed air from the forward end of the cylinder 84 and admit it at the rear end and thus reverse the movement of the rack 87 and return the cage 55 and its contents to its horizontal or receiving position.

The return movement of the cage causes the square stud 63 to engage in the square socket in the member 28—29 and thus again couple the cage to its rotative mechanism and at the same time move the shaft 21 against the resistance of the spring 30 and again actuate the levers 43—44 and 41 and close the clutch 37—38 and start the belt 33 again.

When the cage is returned to its receiving or horizontal position, pull member 71 is caused to draw the collar 66 longitudinally of the member 61 until it engages a stop flange 95 on the member 61, the continued forward movement of the member 61 moving the latter along the shaft or rod 60 and again protruding the fingers 65 to again form the bundle receiving pockets, which are again filled consecutively, as before described.

The compressed air may be held in the cylinder against the forward face of the piston 85 to cause the portion 63 of the member 61 to be retained in positive coupled relation with the shaft 21 and its co-active parts.

When the compressed air is admitted to the cylinders 84 and the cables 76 actuated by the movement of the pistons therein, as before described, the initial horizontal movement of the cage deflects the forward bights of the cables 76 and this deflection is compensated for without detriment to the continuous action of the belts by employing the take up springs 75, as will be obvious.

The cage 55 may be constructed to contain any required number of the sets of fingers 65, but for the purpose of illustration a sufficient number are shown to form 6 of the pockets, thus forming shocks or stooks of six bundles each.

The parts will be so proportioned that while the cage with its load is being moved into discharging position it covers the same spot over the ground, thus allowing the cage to be gradually drawn from the shock or stook.

The improved apparatus can be manufactured of any suitable material and any suitable size or capacity.

In Figs. 8 and 9 another means of arranging the fingers 65 is shown consisting in attaching spaced ears 95 to the inner face of the member 61 and pivoting radius bars 96 to the ears, the bars having anti-friction rollers pivoted between them at their ends, to bear above and below the finger 65.

By this means the fingers operate constantly between yieldable and anti-friction bearings and are thus effectually prevented from cramping during their movement.

Having thus described the invention what is claimed as new is:

1. In an apparatus of the class described guide tracks in spaced relation and each including a horizontal portion and an inclined portion, a receptacle for the grain initially mounted on the horizontal portion of said tracks, and means for moving said receptacle along the horizontal and the inclined portions of said tracks to cause the same to assume a vertical position to discharge its load, and means for returning said receptacle to its horizontal position.

2. In an apparatus of the class described guide tracks in spaced relation and each including a horizontal portion and an inclined portion, a receptacle for the grain having guide sheaves engaging said tracks and initially mounted thereby on the horizontal portion of the said tracks, and means for moving said receptacle along the horizontal and the inclined portions of said tracks to cause the same to assume a vertical position to discharge its load, and means for returning said receptacle to its horizontal position.

3. In an apparatus of the class described guide tracks in spaced relation and each including a horizontal portion and an inclined portion, a receptacle for the grain having guide sheaves engaging said tracks, an endless pull cable connected to said receptacle and yieldably supported, and means for actuating said pull cable to cause the receptacle to pass from a horizontal to a perpendicular position.

4. In an apparatus of the class described a supporting frame, guide tracks in spaced relation mounted on said frame and each including a horizontal portion and an inclined portion, a receptacle for the grain having guide sheaves engaging said tracks, cable guide sheaves carried by said frame, one of said cable guide sheaves being yieldable, an endless cable engaging over said cable guide sheaves and connected to said receptacle, and means for actuating said cable to cause said receptacle to pass from a horizontal to a perpendicular position.

5. In an apparatus of the class described a cage to receive bundles of grain when delivered from a binder, a tubular member within the cage and having transverse apertures, a rod movable within the cage, a plurality of fingers pivoted to said rod and extending respectively through said apertures, means for moving said receptacle from a horizontal to a perpendicular position, and means for withdrawing said fingers when the receptacle assumes a vertical position.

6. In an apparatus of the class described a cage to receive bundles of grain when delivered from a binder, a tubular member within the cage and having transverse apertures, a rod movable within the cage, a plurality of fingers pivoted to said rod and extending respectively through said apertures, anti-friction rollers swingingly supported upon said tubular members and between which said fingers operate, means for moving said receptacle from a horizontal to a perpendicular position, and means for withdrawing said fingers when the receptacle assumes a vertical position.

7. In an apparatus of the class described, a cage to receive bundles of grain when delivered from a binder, a tubular member within the cage and having transverse apertures, a plurality of fingers swingingly supported within said tubular member and extending respectively through said apertures, anti-friction rollers swingingly supported upon said tubular member and between which said finger operates, means for moving said receptacle from a horizontal to a perpendicular position, and means for withdrawing said fingers when the receptacle assumes a vertical position.

8. In an apparatus of the class described, a cage to receive bundles of grain when delivered from a binder, a tubular member within the cage and having transverse apertures, a plurality of fingers swingingly supported within said tubular member and extending respectively through said apertures, anti-friction rollers swingingly supported upon said tubular member and between which said finger operates, means for moving said receptacle from a horizontal to a perpendicular position, and means for withdrawing said fingers when the receptacle assumes a vertical position.

In testimony whereof I affix my signature hereto.

ALBIN P. LOFSTRAND.